(12) United States Patent
Yao (10) Patent No.: US 11,461,697 B2
(45) Date of Patent: Oct. 4, 2022

(54) CONTEXTUAL MODELING USING APPLICATION METADATA

(71) Applicant: BUSINESS OBJECTS SOFTWARE LTD., Dublin (IE)

(72) Inventor: Cheng Yu Yao, Richmond (CA)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 365 days.

(21) Appl. No.: 16/432,203

(22) Filed: Jun. 5, 2019

(65) Prior Publication Data
US 2020/0387823 A1 Dec. 10, 2020

(51) Int. Cl.
| | |
|---|---|
| G06F 3/0481 | (2022.01) |
| G06N 20/00 | (2019.01) |
| G06F 9/451 | (2018.01) |
| G06F 11/34 | (2006.01) |
| G06F 3/0482 | (2013.01) |

(52) U.S. Cl.
CPC ............ G06N 20/00 (2019.01); G06F 9/451 (2018.02); G06F 11/3438 (2013.01); G06F 3/0482 (2013.01)

(58) Field of Classification Search
CPC ....... G06N 20/00; G06F 3/0482; G06F 9/451; G06F 11/3438
See application file for complete search history.

(56) References Cited

U.S. PATENT DOCUMENTS

| | | | |
|---|---|---|---|
| 10,855,625 B1* | 12/2020 | Viswanathan | H04L 51/18 |
| 11,017,299 B1* | 5/2021 | Badr | G06N 5/02 |
| 2011/0302110 A1* | 12/2011 | Beers | G06F 16/248 |
| | | | 706/11 |
| 2017/0161844 A1* | 6/2017 | Rojas | G06Q 40/02 |
| 2017/0344895 A1* | 11/2017 | Roy | G06N 20/00 |
| 2018/0157499 A1* | 6/2018 | Lee | G06F 9/4451 |
| 2018/0173403 A1* | 6/2018 | Carbune | G06F 3/04817 |
| 2018/0349478 A1* | 12/2018 | Carlisle | G06F 16/337 |
| 2019/0014205 A1* | 1/2019 | Miloseski | H04M 1/72451 |
| 2019/0163710 A1* | 5/2019 | Haghighat Kashani | |
| | | | G06N 20/00 |
| 2020/0133641 A1* | 4/2020 | Sinn | G06F 9/453 |
| 2020/0372219 A1* | 11/2020 | Relangi | G06N 3/0445 |
| 2021/0075749 A1* | 3/2021 | Viswanathan | G06F 9/542 |

\* cited by examiner

*Primary Examiner* — Anil K Bhargava
(74) *Attorney, Agent, or Firm* — Buckley, Maschoff & Talwalkar LLC (57) ABSTRACT

Provided is a system and method for building context from software applications and applying the context to visual settings in a graphical user interface. In one example, the method may include receiving an identification of actions performed by a user with respect to a user interface of a software application, receiving application metadata of the actions from the software application, the application metadata providing context associated with the actions, training one or more predictive models to predict user interface preferences for the user based on the actions and the application metadata, and storing the one or more trained predictive models via a storage device.

19 Claims, 8 Drawing Sheets

| Manage Expenses | Submissions | *Transactions* | . . . | — 310 |

313 points to Transactions tab

| | Card A | Card B | *Card C* |

323 points to Card C

TRANSACTIONS 360

| Expense Detail | Category | Date | Amount |
| --- | --- | --- | --- |
| Office Warehouse | Promotional | 07/17/2018 | $291.08 |
| Airline A | Travel | 07/09/2018 | $565.40 |
| Restaurant 1 | Food | 07/03/2018 | $123.19 |
| Restaurant 2 | Food | 07/02/2018 | $68.59 |
| Airline B | Travel | 06/30/2018 | $1123.87 |
| . . . | . . . | . . . | . . . |

FIG. 5

CONTEXTUAL MODELING USING APPLICATION METADATA

BACKGROUND

Business operations can generate a large amount of information in the form of e-mails, memos, notes from call-centers, news, user groups, chats, reports, web-pages, presentations, image-files, video-files, marketing material, and the like. Business intelligence, also referred to as BI, is a set of technologies that transform raw business data into meaningful and useful information used to enable more effective strategic, tactical, and operational insights and decision-making. Analysis of BI data was once a function of specialists and IT personnel. Recent trends, however, place the responsibility of BI analysis on many employees across various departments. These new users are often less technically oriented, so they require an interface that is more intuitive and which can be mastered with a minimum of training.

Users often have different preferences when viewing the same data. For example, a user in the accounting department may be interested in a different parameter of data than a user from the human resources department. For example, the accounting user may desire to know currency breakdown of spending, while human resources may desire to know employee pay breakdown from spending. Typically, a software application provides a generic setting (default setting) for viewing data. Here, the user must manually adjust the visual settings of the user interface to filter data (remove unwanted data), drill-down into data, and the like, to view the data as they would prefer. Accordingly, what is needed is an improved mechanism for implementing user-specific settings.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Visualizing data is a core aspect of business intelligence applications. Graphical views (e.g., two-dimensional, three-dimensional, etc.) create an easier way to understand the underlying data in comparison to a user having to read a text-based description. A graphical view may be rendered within a user interface associated with the application and may include visual components such as charts, graphs, maps, and the like. Charts may include simple bar charts to more esoteric forms such as waterfalls, gauges, funnels, and the like. Initially, the user interface may be populated with parameters based on a generic (default) setting which is common across all users. Over time, users may develop preferences for how they like to view the underlying data. For example, one user may prefer a bar chart while another user prefers a waterfall chart. Preferences may be based on a role of the user at the business, personal preferences, time-of-day, location, and the like.

The example embodiments provide for a system which creates a graphical view of data that automatically adapts/adheres to the user's own preferences. The system may be implemented in conjunction with third-party software applications that provide graphical views of data, for example, enterprise resource planning (ERP) software, analytics, inventory management, and the like. Rather than require users to manually implement settings for viewing the data, the system described herein can learn how users like to view various data items (e.g., measures, dimensions, etc.) and how such views are different with respect to a default view.

The system can include various models (e.g., neural networks, natural language processing, etc.) which are trained based on how the user interacts with the visual settings of the user interface and application metadata provided from the third-party application. Once trained, the models can be used to automatically configure user-specific visual settings for the user based on the type of data they are viewing. For example, different dimensions and measures may have different visual parameters. In some embodiments, the system may learn and apply preference settings across multiple data items. For example, the system may identify a preference/setting associated with a first data item that can be applied to a second (different type) of data item.

Business intelligence data is essentially columnar/row data or field data from a database table. These data items on their own do not provide much possibility for learning. To more efficiently learn user preferences, the system described herein can receive application metadata along with the identification of the user interactions with a software application user interface. The application metadata may provide context associated with the data items being viewed by the user. For example, the user action of viewing revenue (dimension) across different regions may not provide much insight. However, when the application metadata provides a current location of the user, then the system can learn additional information such a correlation between the user viewing a revenue breakdown across regions of a geographical area with respect to a geographic location of the user provided by the application metadata. In this case, the system may identify that the user is located in Canada. Therefore, the system may determine that Canada should be a region of interest/filter when the user views the dimension for revenue.

The system may be implemented in connection with a software application (or other type of application) that provides user interface visualizations. Here, the system may be separate (e.g., an external service, etc.) which receives data from the software application. In the example embodiments, the system may receive the action of the user and the application metadata associated with such action. Based on the combination of user actions and application metadata, the system may determine how a user prefers to view different types of data through the application. Thus, user-specific preferences may be learned by the system.

To facilitate the retrieval of application metadata, the system may implement a template which is provided to the software application and which allows the system to understand how the application metadata is captured. The template allows the system to commonly receive application metadata from different third-party applications. Thus, context can be created based on application metadata and used to more efficiently render user interface settings of interest based on user-specific preferences that are learned.

Context can provide more meaningful insight when it comes to business intelligence. For example, a general business intelligence application may provide a user with the biggest expense from the previous year as well as the type of expense that made up the spending. For example, the general BI application may indicate that a user spent $30,000 last year and the biggest type of expense was travel. Meanwhile, a contextual BI application can provide meaningful insight that is more helpful and suggestive than a generic explanation of expenses. For example, contextual BI can leverage analytics (machine learning, etc.) to provide more insight into the data. In this same example above, a contextual BI application may indicate that the user could have saved $3000 by changing airlines, indicate that the user spent $50 more on transit each month than the cost of a monthly train pass, etc.

To build context requires access to contextual data sources. For example, context may be acquired by asking the user pre-defined questions based on a template, etc. However, building context in this fashion can put a lot of effort on the user. For example, a BI application may offer views of thousands of measures and dimensions. It would take a significant amount of time for a user to provide their preferences/context for each of these thousands of measures and dimensions.

In contrast, the example embodiments can build context through integration with a software application (e.g., a third-party software application, etc.) which the user interacts with. Software applications have a model that includes required contextual information. The system described herein may be integrated with the application and understand how the model of the application works to gather context. This allows the system to obtain this context (in the form of application metadata) from the application. Furthermore, the system may learn from the context and the user actions using contextual models which predict preferences of the user. These preferences may be provided to the application such that when the user access the application again, the application will intuitively know how the user would like to view content. The system can continue to learn from the user interacting with the application and continue to update the contextual models. This information can be provide to the application as an update.

Figure 1A:
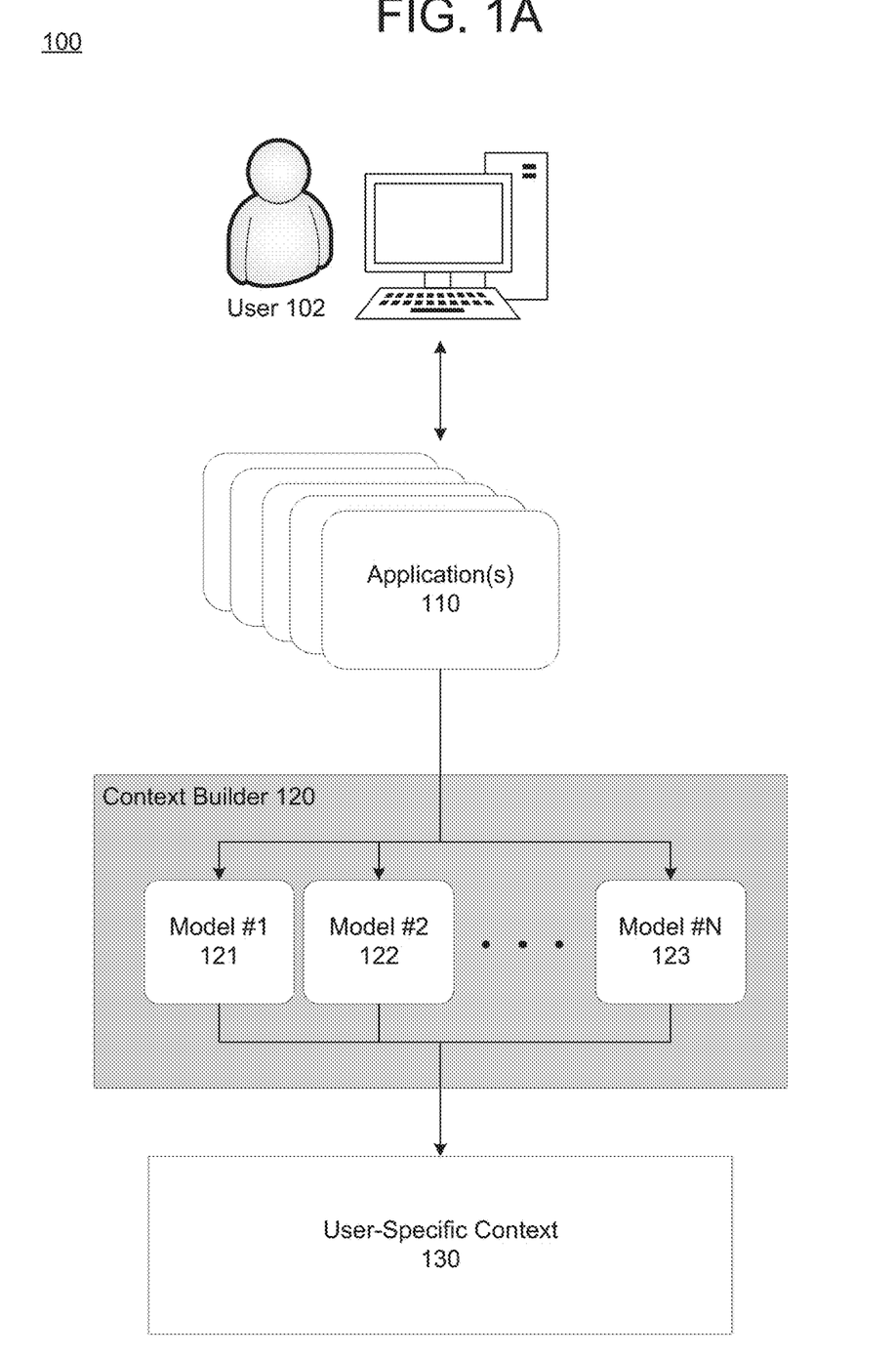
FIG. 1A is a diagram illustrating an architecture for modeling contextual data in accordance with an example embodiment.
Figure 1B:
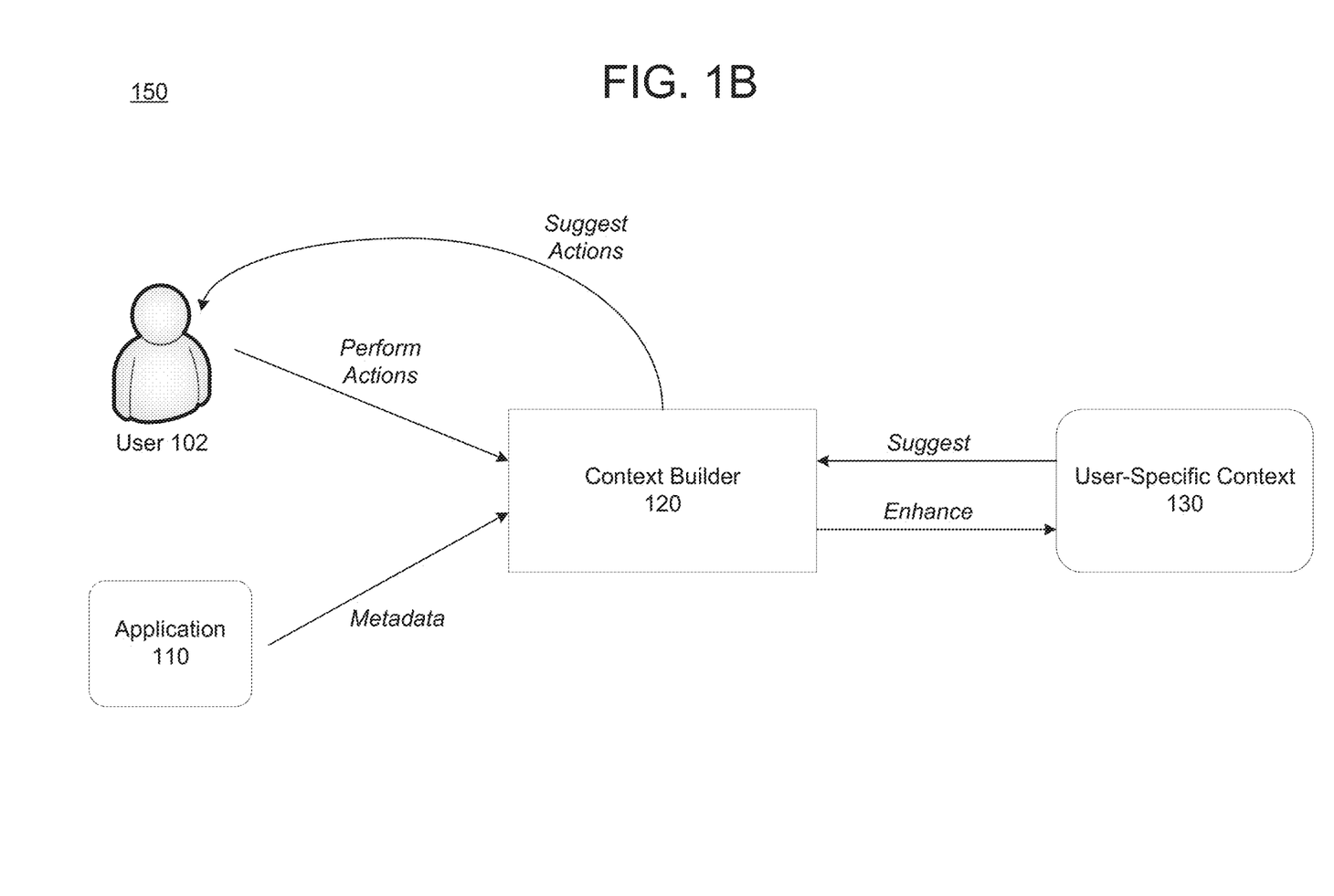
FIG. 1B is a diagram illustrating a process of generating contextual models and applying the contextual models to application preferences in accordance with an example embodiment.

FIG. 1A illustrates an architecture 100 for modeling contextual data in accordance with an example embodiment, and FIG. 1B illustrates a process 150 of generating contextual models and applying the contextual models to application preferences based on the architecture 100 shown in FIG. 1A, in accordance with an example embodiment. Referring to FIG. 1A, a user 102 has access to one or more applications 110. The applications 110 may be business intelligence applications, but are not limited thereto. The application 110 may be hosted by application servers such as web servers, cloud platforms, databases, and the like.

According to various embodiments, context may be acquired by a context builder 120 which may be stored on a separate system such as a cloud platform, or the like. In this example, the applications 110 may be already existing applications which are owned and operated by third-party vendors, and also referred to as third-party applications while the context builder 120 is an independent/remote system that is operated by a different party, however, embodiments are not limited to third-party applications and the context builder 120 may be integrated into an application or multiple applications. The context may provide additional information beyond just the business-related data. For example, the context may provide information about how a user likes to view user interfaces, a time of day, a geographic location of the user, a role of the user within an organization, and the like.

In this example, when the user 102 uses the application 110, user interactions and application data (metadata) may be forwarded to the context builder 120. Here, the context builder 120 may be a service that receives an identification of user actions as well as what type of question or query is being created within the application 110 from the application data. The context builder 120 may include one or more contextual models 121-123, etc., which are configured to determine context based on how a user interacts with the applications 110. For example, the context may be built based on the user interactions (e.g., questions, queries, etc.) into the application 110 plus application metadata. The contextual models may include machine learning models, natural language processing models, and the like, which are trained over time based on how the user interacts with the applications 110. The resulting context is stored in a user-specific context 130 data file or data store.

Referring now to FIG. 1B, inquiries input by the user 102 into the application 110 plus application metadata may be combined to create the user-specific context 130. The user-specific context 130 can subsequently be consumed by the applications 110 to enhance/improve the user's experience. For example, user interface settings, parameters, attributes, breakdowns, etc., can be changed with respect to default interface settings based on how a user interacts with the applications 110 over time. In this example, both the user actions and metadata from the application 110 are input into the context builder 120. The contextual models 121-123 may generate, predict, determine, etc., context based on these user interactions. The context may be stored within the user-specific context 130.

The user-specific context 130 may be provided as suggestions to the application 110 (or a host of the application 110). When the user 102 subsequently uses the application 110, the user-specific context 130 may be used by the application 110 to enhance or otherwise improve the user's experience. For example, the user-specific context 130 may identify specific visual settings, drill-downs, filters, etc., that the user 102 prefers when viewing various data items, pages, etc., of the application 110. These preferences may be learned by the models from the actions and the application metadata. As the user 102 continues to re-use the applications 110, the context builder 120 can continually update/enhance the user-specific context 130, and the user-specific context 130 can continually be provided to the application 110 to improve the user experience.

Figure 2:
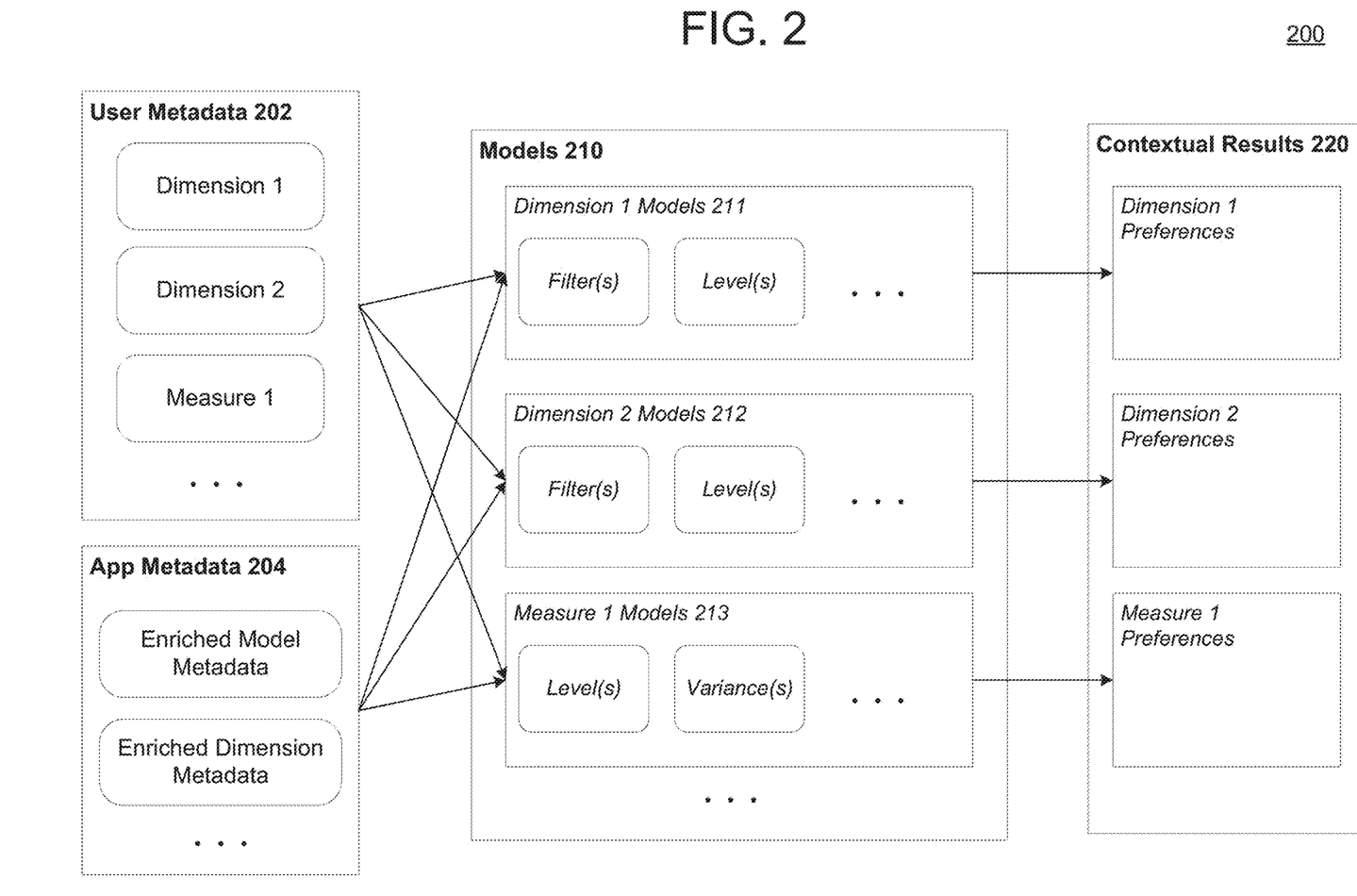
FIG. 2 is a diagram illustrating an architecture for modeling context for dimensions and measures in accordance with an example embodiment.

FIG. 2 illustrates an architecture 200 for modeling context for dimensions and measures in accordance with an example embodiment. The architecture 200 of FIG. 2 is tailored towards data items such measures and dimensions. In this example, measures refer to items such as expenses, sales, revenue, etc., which are measured with numerical values. Meanwhile, dimensions refer to attributes which can be used to divide or otherwise split-up a measure into a smaller breakdown. For example, region may be a dimension and can be used to break-up sales into regions such as countries, etc. In the example of FIG. 2, each data item (e.g., dimension and measure) may have their own set of contextual models 210 which can be used to identify user context associated with each respective data item. In some cases, the user preferences may be different based on the type of dimension or the type of measure. In some cases, the models may learn across different dimensions and/or variables to identify commonalities across the different data items when it comes to user preferences (context).

Referring to FIG. 2, user metadata 202 based on user actions and application metadata 204 based on an application being interacted with by the user are input into a contextual builder which includes a plurality of models 210. Here, each dimension, measure, etc., that may be accessed in the application may have its own group of contextual models that may include neural networks, natural language processing, etc., which can be used to learn from the behavior of a user interacting with the specific data item within the application and create results 220 that are user-specific and designated on a data item basis. For example, a user may desire to view a dimension differently than a default setting. For example, a user may desire to view sales by provincial regions in Canada rather than by state-by-state regions in USA. Context associated with the user such as an IP address, a geographical location, etc., which provide a location of the user as being in Canada, and which are included in the application metadata may be used to learn that the user prefers these settings.

The user metadata 202 may include user queries, questions, etc., into the dimensions and measures of the application. For example, the user metadata 202 may include how the user views a specific dimension, measure, etc. The user metadata 202 may include what pages the user drills-down into, the filters being applied, and the like.

The application metadata may include enriched model metadata and enriched dimension metadata, etc. For example, an application to handle employee expenses can define model metadata to include information pertinent to the type of expenses (e.g., travel expenses, procurement expenses, etc.). In addition, for each of its dimensions, the application can provide specific metadata. The metadata can help define each dimension. For example, the same employee expense application can define the measure "Expense 1" to be a measure of type expense, and that the expense was paid by the company. Similarly, "Expense 2" can be the same expense type, but it may be an expense in which it was paid by the employee. Furthermore, it can defined by a dimension "CCenter" with metadata which tags the dimension to a physical location and cost center. Further, it could also include metadata that points the dimension "UserID" to a specific employee. With these extra metadata, the system herein may differentiate, and categorize entities. For example, "Expense 1" and "Expense 2" now has a connection where both are of the expense type, but they are also different due the difference on who paid the cost. In comparison, without the metadata, the system only knows that "Expense 1" and "Expense 2" have different names. Thus, unable to make any meaningful connections. Effectively, these extra metadata allow for uniform representations of the models and their underlying structures by providing ways to categorize entities found in the model and the models themselves. By including said metadata, it can provide meaningful connections and links for the system which allow the machine to learn the effect of an user action more quickly, efficiently, and confidently.

Based on the combination of the user metadata 202 and the application metadata 204, the models 210 may create contextual results 220 which can be fed back into the application to predict settings and parameters of a user interface for the user. For example, the contextual results 220 may be used to predict a drill-down, a filter to apply, a variance to apply, and the like, to a particular dimension, measure, etc., being viewed by the user via the user interface.

Figure 3A:
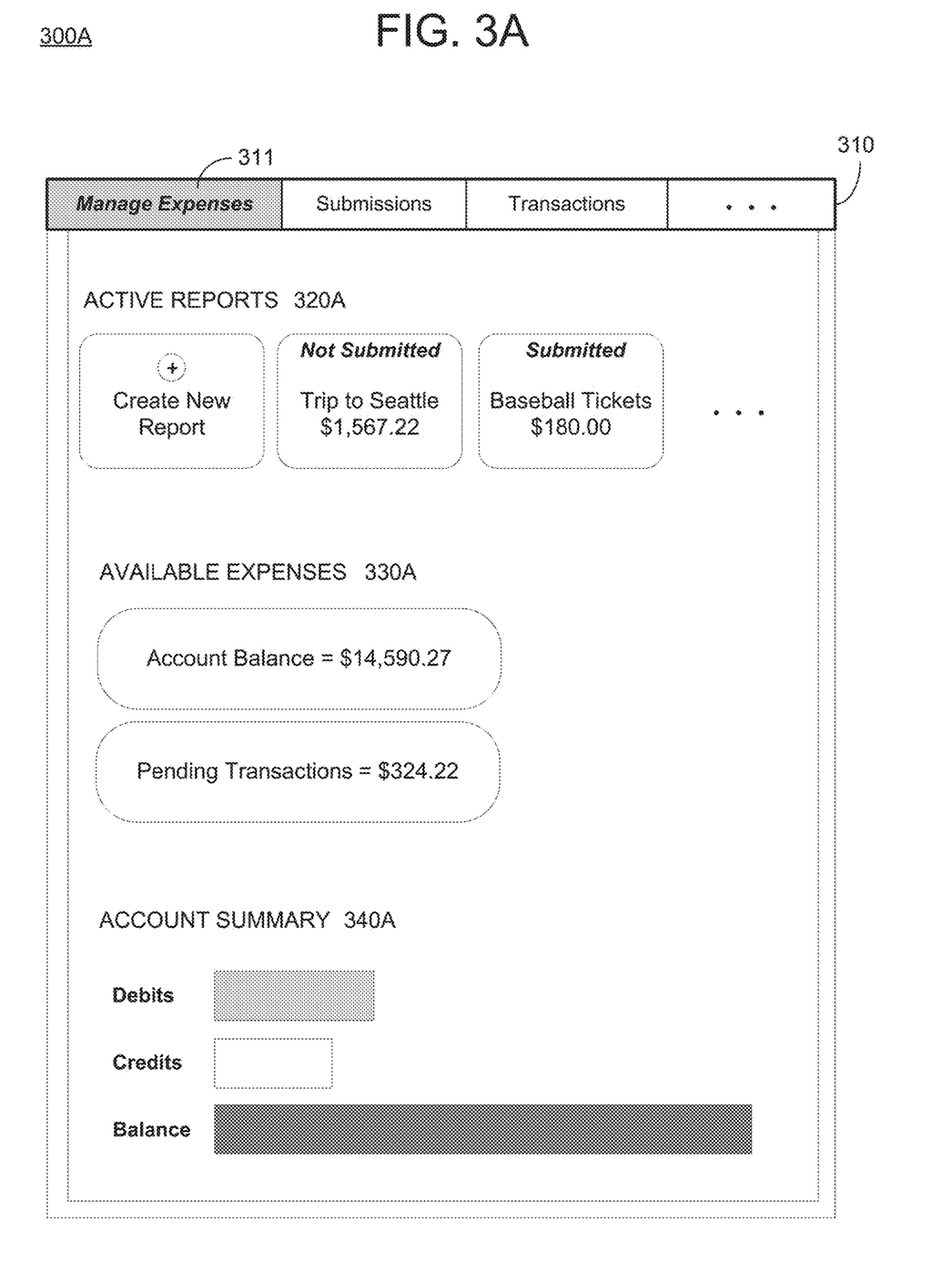
FIGS. 3A-3C are diagrams illustrating examples of user interactions with a user interface, in accordance with example embodiments.
Figure 3B:
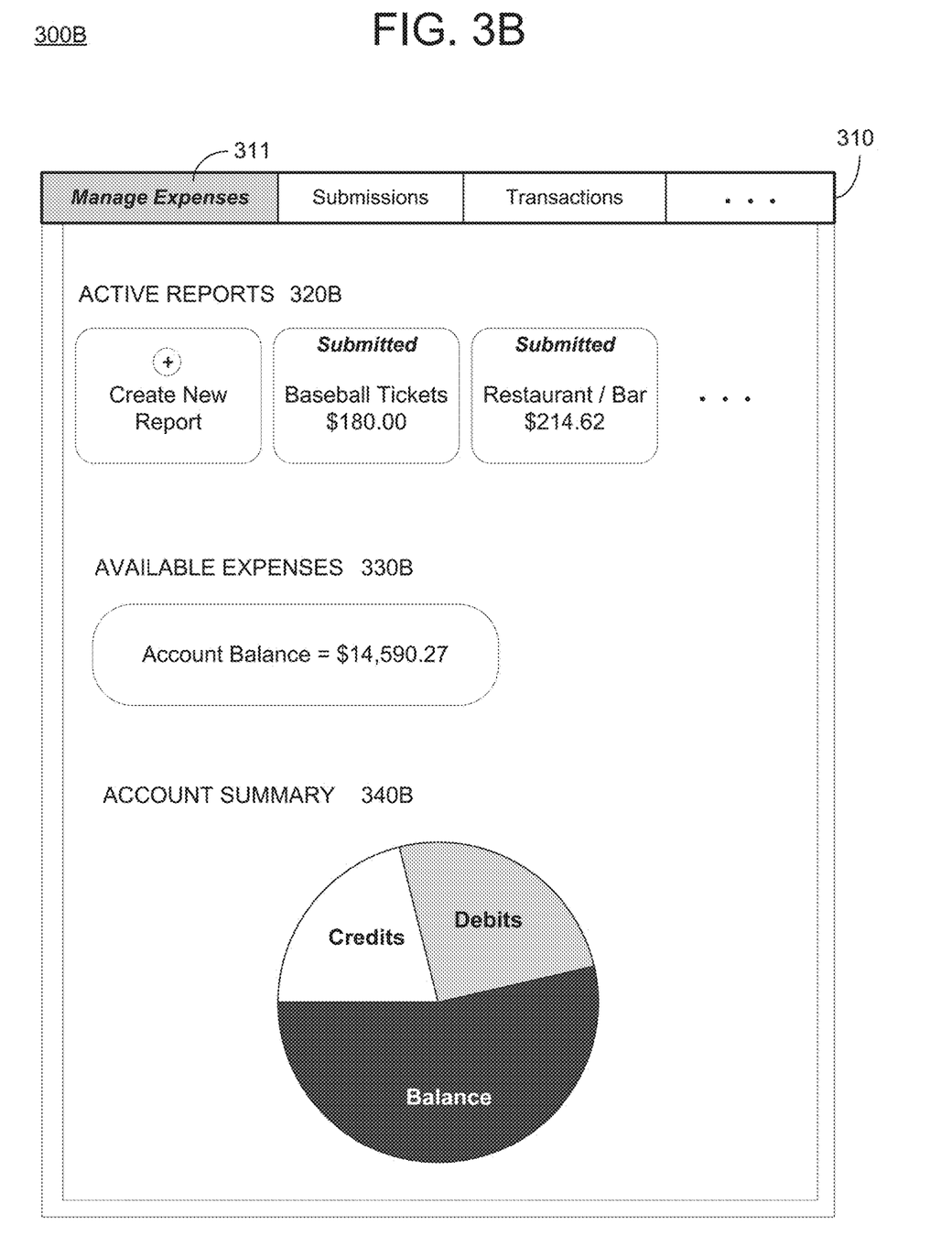
Figure 3C:
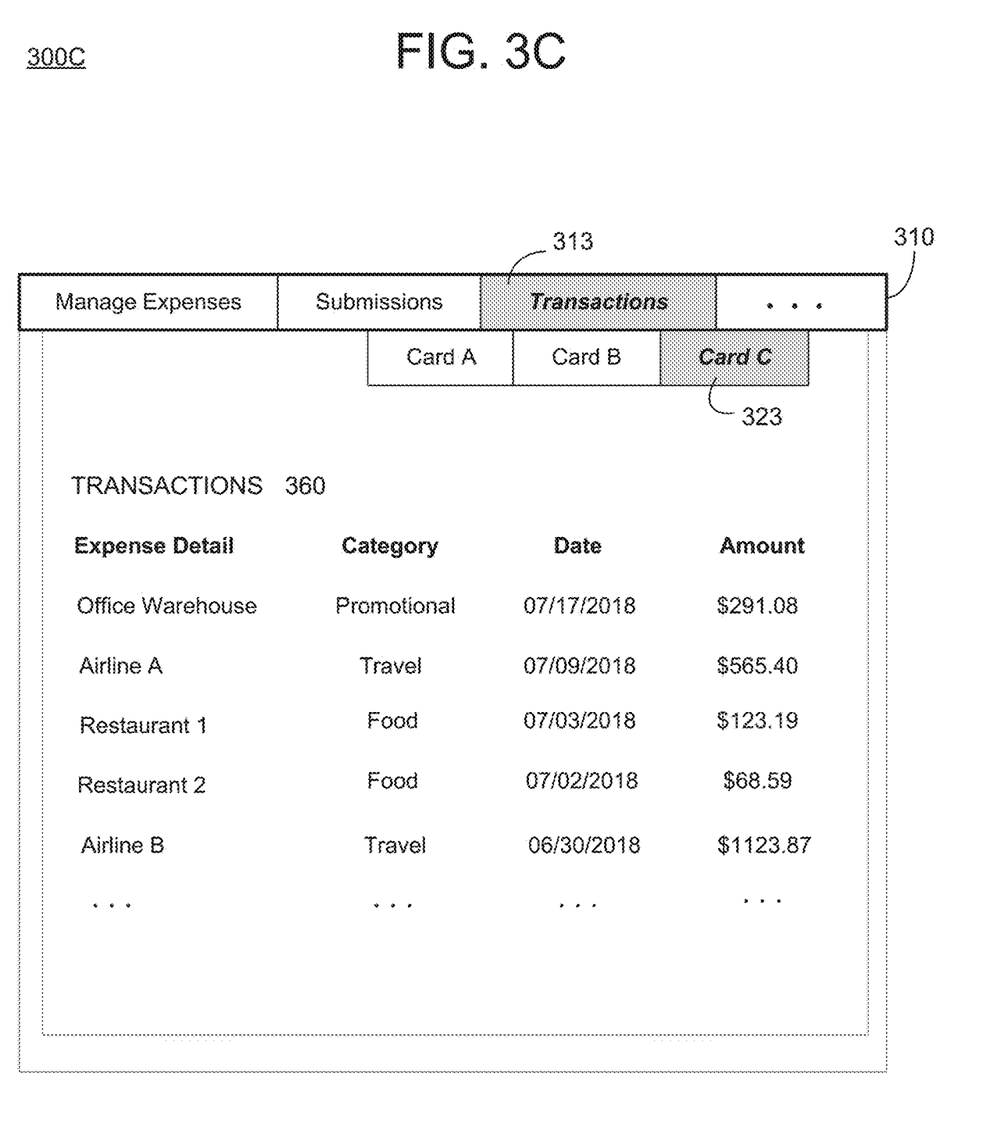

FIGS. 3A-3C illustrate examples of user interactions with a user interface, in accordance with example embodiments. FIG. 3A illustrates a default user interface 300A. The default user interface 300A is generic across all users and is the starting page when a user opens up a software application that is associated with the default user interface 300A. The default user interface 300A initially loads an expenses page. Here, the expense button that is the first menu item 311 in the menu bar 310. The default display of the expenses includes a listing of submitted and non-submitted expense reports 320A, a summary of available expenses 330A in one or more payment accounts, and an account summary 340A which breaks down debits, credits, and balance of the account over the past 30 days.

Over time, a user may interact with the default user interface 300A and prefer to have the settings as shown in the modified user interface 300B shown in FIG. 3B. In this example, rather than opening up the active reports to show both submitted and non-submitted expense reports, the user prefers to see only the submitted expense reports as shown in active reports 320B. Meanwhile, the user does not like to view information about pending transactions but only desires to see the account balance as shown in the available expenses section 330B. Furthermore, instead of a bar chart as shown in the summary 340A, the user prefers to see the account summary as a pie chart as shown in summary 340B. In this case, rather than require the user to perform actions to change each of these different settings, the system described herein can learn that this is the screen the user prefers to open with. Accordingly, the application may replace the default user interface 300A with the modified user interface 300B when the user performs a query or other request in association with the measure of expenses.

FIG. 3C illustrates a drill-down user interface 300C in which the user has drilled-down into a few hierarchical levels of the application to view further details of the expenses. In particular, in the example, the user has selected the transactions menu item 313 from within the menu bar 310. Furthermore, the user prefers to see the transactions that are associated with sub-menu item 323 which corresponds to Card C which is a payment card of the user. Therefore, the drill-down user interface 300C shows transactions 360 of Card C instead of starting at the expense page. The system described herein can learn that the user prefers this drill-down user interface 300C as an opening screen rather than the default user interface 300A. Accordingly, when the user creates a query or request for expense data, the application may automatically drill-down into transactions for Card C, and shown the user the information they are specifically interested in rather than starting at the default user interface 300A and requiring the user to change parameters and settings.

Figure 4:
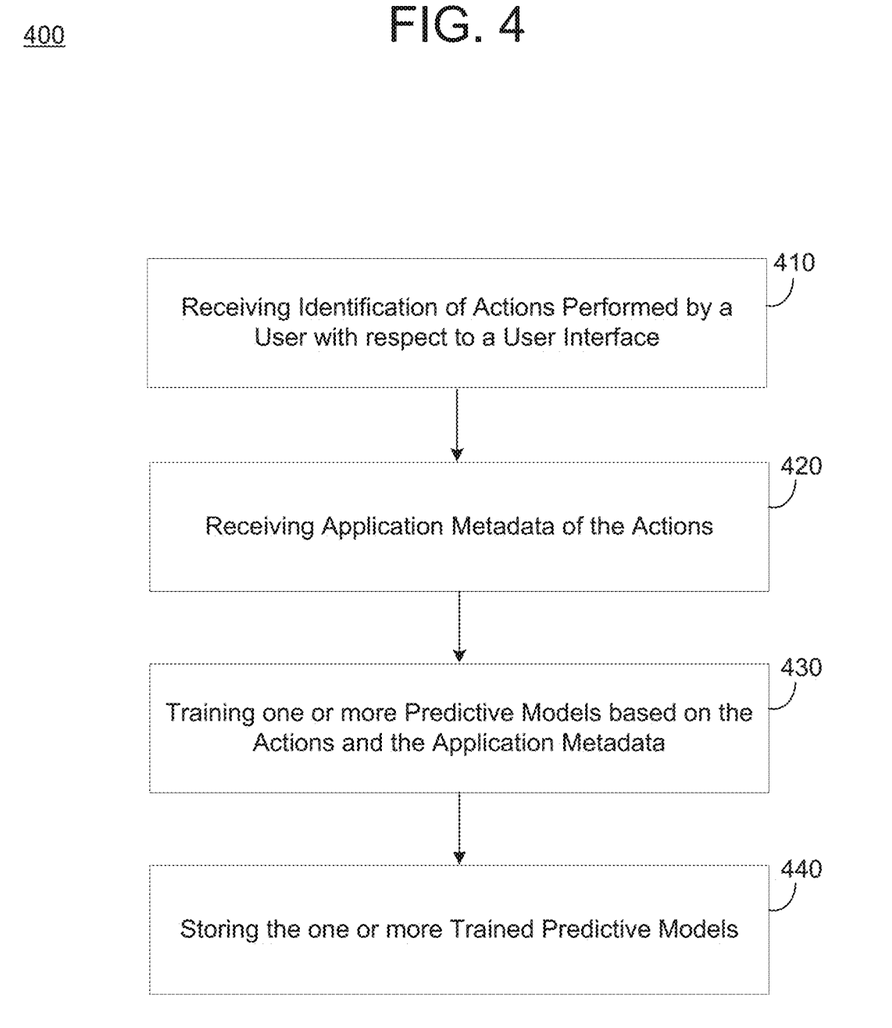
FIG. 4 is a diagram illustrating a method of training a predictive model for predicting user preferences in accordance with an example embodiment.

FIG. 4 illustrates a method 400 of training a predictive model for predicting user interface preferences in accordance with an example embodiment. For example, the method 400 may be performed by a web server, a cloud platform, a user device, a database, and/or the like. Referring to FIG. 4, in 410, the method may include receiving an identification of actions performed by a user with respect to a user interface of a software application. For example, the identification may include information identifying how a user is manipulating parameters and settings within the user interface such as commands being submitted, filters being applied, drill-downs being performed into additional screens/attributes, and the like. The actions may be associated with a particular data item such as a dimension, a measure, or the like. The identification may be received from the application or it may be captured by the system from the user's device where the manipulating is being performed.

In 420, the method may include receiving application metadata that is associated with the actions from the software application. For example, the application metadata may provide context associated with the actions performed by the user. The context may help relate the manipulations of the user interface with specific data items (e.g., measures, dimensions, etc.) being viewed. Here, the application metadata may identify at least one of measures and dimensions being viewed with the user interface. The application metadata may identify which filters the user applies to the data item, which screen or attribute the user drills-down into in association with the data item, and the like.

In 430 the method may include training one or more predictive models to predict user interface preferences for the user based on the actions and the application metadata, and in 440 the method may include storing the one or more trained predictive models via a storage device. For example, the training may include training the one or more predictive model to change default visual settings of the user interface based on interactions of the user over time with the default settings of the user interface. In some embodiments, each dimension and/or measure may have a plurality of models associated therewith that are dedicated to identify various aspects of the user actions performed with respect to the dimension and/or measure. For example, here, the training may include training a first plurality of contextual models which are associated with a plurality of dimensions of data capable of being viewed with the user interface, respectively. As another example, the training may include training a second plurality of contextual models which are associated with a plurality of measures of data capable of being viewed with the user interface, respectively.

In some embodiments, the method may further include receiving a request from the user for a visualization of a type of data, and predicting user interface preferences of the user for viewing the type of data based on a trained predictive model associated with the type of data. As an example, the predicting may include predicting a drill-down level of the user interface for viewing hierarchical attributes of the type of data. As another example, the predicting may include predicting one or more data filters to apply to the type of data for removing unwanted attributes of the type of data.

Figure 5:
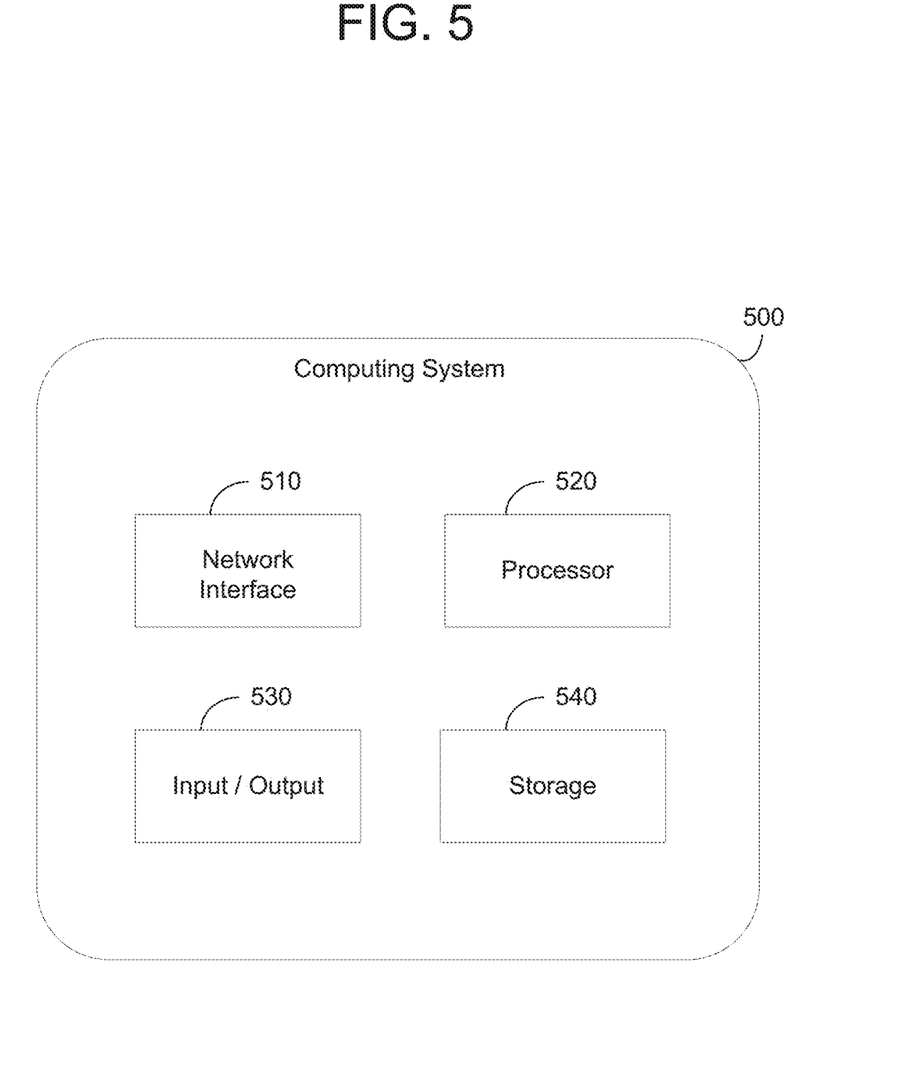
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 5. According to various embodiments, the storage 540 may include a data store having a plurality of tables, partitions and sub-partitions. The storage 540 may be used to store database records, items, entries, and the like. Also, the storage 540 may store data that is sensed by one or more sensors. Sensor data may include pressure, humidity, temperature, flow rate, and the like. In some cases, the storage 540 may store information about an operator such as skill level and/or certifications. For example, the storage 540 may store operating data of a target resource which is collected locally, received via the network interface 510, and the like. The operating data may be associated with previous occurrences of an event at the target resource.

According to various embodiments, the processor 520 may receive an identification of actions performed by a user with respect to a user interface of a software application. For example, the actions may be detected by the processor 520 based on local actions being performed by an input on of the computing system 500. As another example, the actions may be transmitted from another device (user device) over a network and received by the network interface 510 and transmitted to the processor 520. The processor 520 may further receive application metadata of the actions from the software application. Here, the application metadata may be received from a third party application (or a host of the third party application) which is transmitted via a network and received at the network interface 510. In some embodiments, the application metadata may provide context associated with the actions.

The processor 520 may train one or more predictive models to predict user interface preferences for the user based on the actions and the application metadata. The predictive models may include machine learning models, for example, neural networks, classification, regression, and the like. In some embodiments, the models may include natural language processing models, and the like. The storage 540 may store the one or more trained predictive models. In some embodiments, the processor 520 may train the one or more predictive model to change default visual settings of the user interface based on interactions of the user over time with the default settings of the user interface. Here, each dimension and/or value associated with the third-party application may have a plurality of models which are used to train a plurality of attributes of the visual settings.

In some embodiments, the processor 520 may receive a request from the user for a visualization of a type of data, and predict user interface preferences of the user for viewing the type of data based on a trained predictive model associated with the type of data. In this example, the processor 520 may predict a drill-down level of the user interface for viewing hierarchical attributes of the type of data via execution of the one or more trained predictive models. As another example, the processor 520 may predict one or more data filters to apply to the type of data for removing unwanted attributes of the type of data via execution of the one or more trained predictive models.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
receive an identification of actions of a user with respect to a user interface of a software application,
receive application metadata of the actions of the user from the software application, the application metadata identifying differences between current user interface settings when the actions are performed via the user interface in comparison to default user interface settings of the user interface, and
train one or more predictive models based on a difference between current visual settings of the user interface when the actions are performed with respect to default visual settings of the user interface, wherein the training of the one or predictive models is to predict measures and dimensions for display via a user interface of the user based on the actions and the identified differences included in the application metadata, wherein the measures comprise numerical values and the dimensions comprise attributes used to break-up the measures into smaller numerical values; and
a storage configured to store the one or more trained predictive models.

2. The computing system of claim 1, wherein the application metadata comprises user interface settings of measures and user interface settings of dimensions being viewed via the user interface.

3. The computing system of claim 1, wherein the processor is configured to train a first plurality of contextual models which are associated with a plurality of dimensions of data, respectively, which are capable of being viewed via the user interface.

4. The computing system of claim 1, wherein the processor is configured to train a second plurality of contextual models which are associated with a plurality of measures of data, respectively, which are capable of being viewed via the user interface.

5. The computing system of claim 1, wherein the processor is further configured to receive a request from the user for a visualization of a type of data, and predict a chart type from among a plurality of chart types for viewing the type of data based on the one or more trained predictive models.

6. The computing system of claim 5, wherein the processor is further configured to predict a drill-down level of the user interface for viewing hierarchical attributes of the type of data via execution of the one or more trained predictive models.

7. The computing system of claim 5, wherein the processor is further configured to predict one or more data filters to apply to the type of data for removing unwanted attributes of the type of data via execution of the one or more trained predictive models.

8. A method comprising:
receiving an identification of actions of a user with respect to a user interface of a software application;
receiving application metadata of the actions of the user from the software application, the application metadata identifying differences between current user interface settings when the actions are performed via the user interface in comparison to default user interface settings of the user interface;
training one or more predictive models based on a difference between current visual settings of the user interface when the actions are performed with respect to default visual settings of the user interface, wherein the training of the one or predictive models is to predict measures and dimensions for display via a user interface of the user based on the actions and the identified differences included in the application metadata, wherein the measures comprise numerical values and the dimensions comprise attributes used to break-up the measures into smaller numerical values; and
storing the one or more trained predictive models via a storage device.

9. The method of claim 8, wherein the application metadata comprises user interface settings of measures and user interface settings of dimensions being viewed via the user interface.

10. The method of claim 8, wherein the training comprises training a first plurality of contextual models which are associated with a plurality of dimensions of data, respectively, which are capable of being viewed via the user interface.

11. The method of claim 8, wherein the training comprises training a second plurality of contextual models which are associated with a plurality of measures of data, respectively, which are capable of being viewed via the user interface.

12. The method of claim 8, further comprising receiving a request from the user for a visualization of a type of data, and predicting a chart type from among a plurality of chart types for viewing the type of data based on a trained predictive model associated with the type of data.

13. The method of claim 12, wherein the predicting further comprises predicting a drill-down level of the user interface for viewing hierarchical attributes of the type of data.

14. The method of claim 12, wherein the predicting further comprises predicting one or more data filters to apply to the type of data for removing unwanted attributes of the type of data.

15. A non-transitory computer-readable medium storing program instructions which when executed by a processor cause a computer to perform a method comprising:
receiving an identification of actions of a user with respect to a user interface of a software application;
receiving application metadata of the actions of the user from the software application, the application metadata identifying differences between current user interface settings when the actions are performed via the user interface in comparison to default user interface settings of the user interface;
training one or more predictive models based on a difference between current visual settings of the user interface when the actions are performed with respect to default visual settings of the user interface, wherein the training of the one or predictive models is to predict measures and dimensions for display via a user interface of the user based on the actions and the identified differences included in the application metadata, wherein the measures comprise numerical values and the dimensions comprise attributes used to break-up the measures into smaller numerical values; and
storing the one or more trained predictive models via a storage device.

16. The non-transitory computer-readable medium of claim 15, wherein the method further comprises receiving a request from the user for a visualization of a type of data, and predicting a chart type from among a plurality of chart types for viewing the type of data based on the one or more trained predictive models.

17. The non-transitory computer-readable medium of claim 15, wherein the predicting further comprises predicting a drill-down level of the user interface for viewing hierarchical attributes of the type of data.

18. The non-transitory computer-readable medium of claim 15, wherein the predicting further comprises predicting one or more data filters to apply to the type of data for removing unwanted attributes of the type of data.

19. The computing system of claim 1, wherein the application metadata comprises differences between current hierarchical drill-down settings for one or more measures and dimensions in comparison to default hierarchical drill-down settings for the one or more measures and dimensions.

* * * * *